United States Patent [19]

Lundy et al.

[11] Patent Number: 5,194,495
[45] Date of Patent: Mar. 16, 1993

[54] PIGMENTED POLYCARBONATE COMPOSITION HAVING HIGH IMPACT STRENGTH AND GOOD COSMETICS

[75] Inventors: Charles E. Lundy, Krefeld-Uerdingen, Fed. Rep. of Germany; Douglas G. Powell, Coraopolis; Sivaram Krishnan, Pittsburgh, both of Pa.

[73] Assignee: Miles Inc., Pittsburgh, Pa.

[21] Appl. No.: 919,617

[22] Filed: Jul. 24, 1992

Related U.S. Application Data

[63] Continuation of Ser. No. 638,464, Jan. 7, 1991, abandoned.

[51] Int. Cl.$^5$ ............ C08L 69/00; C08L 55/02; C08L 23/26
[52] U.S. Cl. ............................ 525/67; 525/71; 524/504
[58] Field of Search ............. 525/67, 71; 524/504

[56] References Cited

U.S. PATENT DOCUMENTS

| | | | |
|---|---|---|---|
| 3,130,177 | 4/1964 | Grabowski | 260/45.5 |
| 3,801,673 | 4/1973 | O'Connell | 260/873 |
| 3,852,393 | 12/1974 | Furukawa et al. | 260/873 |
| 3,954,905 | 5/1976 | Margotte et al. | 260/873 |
| 3,988,389 | 10/1976 | Margotte et al. | 260/873 |
| 4,122,131 | 10/1978 | Bussink et al. | 260/873 |
| 4,172,859 | 10/1979 | Epstein | 428/402 |
| 4,205,141 | 5/1980 | Liebig et al. | 525/67 |
| 4,410,662 | 10/1983 | Witman et al. | 525/148 |
| 4,420,584 | 12/1983 | Rawlings et al. | 524/502 |
| 4,677,162 | 6/1987 | Grigo et al. | 525/67 |
| 4,883,840 | 11/1989 | Cartasegna | 525/67 |

FOREIGN PATENT DOCUMENTS

| | | | |
|---|---|---|---|
| 197458 | 11/1984 | Japan . | |
| 156850 | 6/1988 | Japan | 525/67 |

*Primary Examiner*—David J. Buttner
*Attorney, Agent, or Firm*—Joseph C. Gil; Aron Preis

[57] ABSTRACT

A pigmented thermoplastic molding composition is disclosed comprising
(i) about 90 to 98 percent of an aromatic polycarbonate,
(ii) about 1 to 9 percent of ABS, and
(iii) about 1 to 9 percent of a grafted olefinic copolymer which is a graft polymer of one or more unsaturated dicarboxylic acid or the anhydride of said acid on an olefinic copolymer backbone.

The composition is noted to have good mechanical properties and the articles molded therefrom have good cosmetics.

10 Claims, No Drawings

PIGMENTED POLYCARBONATE COMPOSITION HAVING HIGH IMPACT STRENGTH AND GOOD COSMETICS

This application is a continuation of U.S. patent application Ser. No. 07/638,464 filed Jan. 7, 1991 now abandoned.

FIELD OF THE INVENTION

The invention relates to thermoplastic molding compositions and more particularly to compositions containing a polycarbonate resin.

SUMMARY OF THE INVENTION

A pigmented thermoplastic molding composition is disclosed comprising
(i) about 90 to 98 percent of an aromatic polycarbonate,
(ii) about 1 to 9 percent of ABS, and
(iii) about 1 to 9 percent of a grafted olefinic copolymer.
The grafted olefinic copolymer is a graft polymer of one or more unsaturated dicarboxylic acid or the anhydride of said acid on an olefinic copolymer backbone. The composition is noted to have good mechanical properties and the articles molded therefrom have good cosmetics.

BACKGROUND OF THE INVENTION

Aromatic polycarbonate resins are well known in the art and have long been used alone and as components in molding compositions. Also known in the art are polycarbonate based compositions which include impact modifying agents. The incorporation of a relatively small amount of an elastomer which has a low glass transition temperature is known to improve the impact performance of the resin. Thus, the additions of any of EPDM, SBS and SEBS block copolymers, MBS, ABS, polyolefins and acrylate based interpolymeric composites to polycarbonate resins have been reported in the patent literature.

While the elastomeric additives generally provide improved impact performance, the beneficial effect which thus characterize some such compositions do not endure long exposure to heat. Polycarbonate compositions which are imparted improved impact performance by the incorporation of butadiene-rich graft copolymers such as ABS or MBS therewith are notorious for their poor heat aging characteristics. Furthermore, polycarbonate compositions which contain rubbery impact modifiers often exhibit lower flowability and/or poor cosmetic properties. The term cosmetic properties in the present context includes such known effects as pearlescent whitening, color streaking and blushing. The present invention is therefore directed to the technical solution to these problems.

Blends of polycarbonate and ABS are well known and are commercially available, for instance under the trademark Bayblend from Mobay Corporation. Noted among the patents relating to this technology are U.S. Pat. Nos. 3,130,177 and 3,852,393. Similar compositions were disclosed in U.S. Pat. Nos. 3,954,905 and 3,988,389.

Polycarbonate compositions containing olefinic resinous components have been disclosed in U.S. Pat. Nos. 3,801,673; 4,122,131; 4,205,141; 4,410,662; and 4,420,584.

A tough thermoplastic polycarbonate composition was disclosed in U.S. Pat. No. 4,172,859. The composition contains a copolymer the generic description of which embraces ethylene copolymers, including ethylene-propylene. Maleic anhydride is listed as a possible comonomer and grafting as a method of preparation is mentioned. U.S. Pat. No. 4,677,162 disclosed a composition containing a polycarbonate resin, an ABS graft copolymer and an impact modifying graft. The composition is said to exhibit low gloss values.

Significantly, the preferred grafted olefinic copolymer of the present invention is known for its heat aging properties and for its utility as an impact modifier for thermoplastic resins, including polycarbonate. On the other hand, the copolymer is incompatible with and forms only a dispersion in polycarbonate resins. Furthermore, the preferred grafted olefinic copolymer does not color nor dye well by coloring agents which are normally suitable for use in polycarbonates. This leads to unfavorable cosmetics in molded parts.

DETAILED DESCRIPTION OF THE INVENTION

In accordance with the present invention, there is provided a pigmented thermoplastic molding composition comprising
(i) about 90 to 98 percent of an aromatic polycarbonate,
(ii) about 1 to 9 percent of ABS, and
(iii) about 1 to 9 percent of a grafted olefinic copolymer.

Preferably, the pigmented composition comprise about
(i) 94 to 98 percent of an aromatic polycarbonate,
(ii) about 2 to 6 percent of ABS, and
(iii) about 2 to 6 percent of a grafted olefinic copolymer.

The pigmented composition offers improved mechanical properties, aging properties and cosmetics.

Aromatic polycarbonates within the scope of the present invention are homopolycarbonates and copolycarbonates and mixtures thereof.

The polycarbonates generally have a weight average molecular weight of 10,000–200,000, preferably 20,000–80,000 and their melt flow rate, per ASTM D-1238 at 300° C., is about 1 to about 65 gm/10 min., preferably about 2–15 gm/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, New York, 1964, all incorporated herein by reference).

In the present context, dihydroxy compounds suitable for the preparation of the polycarbonates of the inventor conform to the structural formulae (1) or (2).

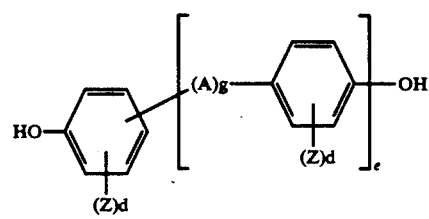

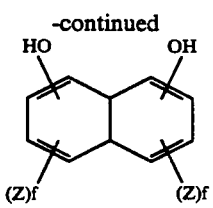

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

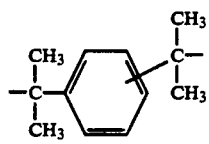

e and g both denote the number 0 to 1;
Z denotes F, Cl, Br or C$_1$–C$_4$-alkyl and if several Z radicals are substituents in one aryl radical, they may be identical or different from one another;
d denotes an integer of from 0 to 4; and
f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxy-phenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)sulfone, hydroxy-benzophenone, 2,4-bis-(3,5-dimethyl-4-hydroxyphenyl)-cyclohexane, α,α'-bis-(3,5-dimethyl-4-hydroxyphenyl)p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compound. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)heptane; 1,3,5-tri-(4-hydroxphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihdroxy-5'-methylbenzyl)-4-methylphenol; 2,4-dihydroxybenzoic acid; 2-(4-hydroxyphenyl)-2-(2,4-dihydroxyphenyl)propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights ad characterized in that their melt flow indices (MFR) per ASTM D-1238 are about 16.5–24, 13–16, 7.5–13.0 and 3.5–6.5 gm/10 min., respectively. These are products of Mobay Corporation of Pittsburgh, Pennsylvania A polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The ABS graft of the invention is an ABS (acrylonitrile—butadiene—styrene) resin which is characterized in a butadiene content of about 35 to 85 percent, preferably about 50 to 75% relative to the weight of the graft, and particle size of about 0.05 to 5 microns, preferably 0.2 to 0.7 microns.

Essentially the moieties of ABS graft polymers consist of two or more polymeric parts of different compositions chemically united. The graft polymers may be prepared by polymerizing at least one conjugated diene, such as butadiene or a conjugated diene with a monomer polymerizable therewith, such as styrene, to provide a backbone, with subsequent polymerization of at least one grafting monomer, and preferably two, in the presence of the prepolymerized backbone to complete the graft polymer.

The backbone, as mentioned, is preferably a conjugated diene polymer or copolymer such as polybutadiene, butadiene-styrene, butadiene-acrylonitrile or the like.

A specific conjugated diene monomer which may be utilized in preparing the backbone of the graft polymer is generically described by the formula:

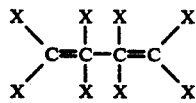

wherein X may be selected from the group consisting of hydrogen, alkyl groups containing from 1 to 5 carbon atoms, chloro and bromo. Examples of dienes that may be used are butadiene; isoprene; 1,2-heptadiene; methyl-1,3-pentadiene; 2,3-dimethyl-1,3-butadiene; 1,3-pentadiene; 2-methyl-3-ethyl-1,3-butadiene; 2-ethyl-1,3-pentadiene; 1,3- and 2,4-hexadienes, chloro- and bromo-substituted butadienes such as dichlorobutadiene, bromobutadiene, chloroprene, dibromobutadiene, mixtures thereof and the like. The preferred conjugated diene utilized herein is butadiene.

The first monomer or group of monomers polymerized in the presence of the prepolymerized backbone are preferably monovinyl aromatic hydrocarbons. The preferred monovinyl aromatic monomers utilized are generically described by the formula:

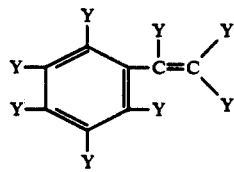

wherein Y may be selected from the group consisting of hydrogen, alkyl groups containing from 1 to 5 carbon atoms, chloro and bromo. Examples of the monovinyl aromatic compounds and substituted monovinyl aromatic compounds that may be used are styrene and other vinyl-substituted aromatic compounds including alkyl-, cyclo-, aryl-, alkaryl-, alkoxy-, aralkyl-, aryloxy-, and other substituted vinyl aromatic compounds. Examples of such compounds are 3-methyl-styrene; 3,5-diethylstyrene and 4-n-propylstyrene, α-methylstyrene, α-methylvinyltoluene, α-chlorostyrene, vinyltoluene, α-bromostyrene, chlorophenyl ethylenes, dibromophenyl ethylenes, tetrachlorophenyl ethylenes, 1-vinylnaphthalene, 2-vinylnaphthalene, mixtures thereof and the like. The preferred monovinyl aromatic hydrocarbon used herein is styrene and/or α-methylstyrene.

The second group of monomers that are polymerized in the presence of the prepolymerized backbone are acrylonitrile, substituted acrylonitrile and/or acrylic acid esters exemplified by acrylonitrile and alkyl acrylates such as methylmethacrylate. The acrylonitrile, substituted acrylonitrile or acrylic acid esters are described generically by the formula:

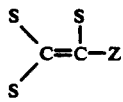

wherein S may be selected from the group consisting of hydrogen, alkyl groups containing from 1 to 5 carbon atoms, chloro and bromo and Z is selected from the group consisting of cyano and carbalkoxy wherein the alkyl group of the carbalkoxy group contains from 1 to about 12 carbon atoms. Examples of monomers of this description, i.e., acrylonitrile, substituted acrylonitrile, or acrylic acid esters of the above formula are acrylonitrile, ethacrylonitrile, methacrylonitrile, α-chloroacrylonitrile, β-chloroacrylonitrile, α-bromoacrylonitrile and β-bromoacrylonitrile, methacrylate, methylmethacrylate, ethylacrylate, butylacrylate, propylacrylate, isopropylacrylate, isobutylacrylate, mixtures thereof and the like. The preferred acrylic monomer used herein is acrylonitrile and the preferred acrylic acid esters are ethylacrylate and methylmethacrylate.

In the preparation of the graft polymer, the conjugated diolefin polymer or copolymer exemplified by 1,3-butadiene polymer or copolymer comprise 35–85% by weight, preferably about 50 to 75% by weight of the total graft polymer composition and the monomers polymerized in the presence of the backbone exemplified by styrene and acrylonitrile comprise about 65 to 15 %, preferably 50 to 25% by weight of the total graft polymer composition.

The preparation of suitable ABS resins is described in U.S. Pat. No. 3,852,393, the disclosure of which is incorporated herein by reference.

Suitable ABS graft resins are known in the art and may be obtained commercially from Bayer AG under the trademark Novadur.

The grafted olefinic copolymer in the context of the invention is a graft polymer of one or more unsaturated dicarboxylic acids or an acid anhydride on an olefinic copolymer backbone having a weight average molecular weight of about 25,000 to 500,000, preferably 30,000 to 100,000 and a glass transition temperature below −30° C., preferably below −50° C. Suitable acids include maleic, citraconic, aconitic, itaconic, citric and fumaric acids and their anhydrides. The copolymer of the invention is preferably substantially amorphous.

A preferred copolymer has an ethylene-propylene copolymer backbone which is grafted with one or more unsaturated cyclic dianhydrides, preferably maleic acid anhydride; in a more preferred embodiment, the backbone contains no residual unsaturation. The amount of ethylene and of propylene in the copolymer backbone may range for each of these components, between 1 and 99 percent by weight, relative to the weight of the backbone. The amount of the grafted phase is about 0.1 to 10%, preferably 0.5 to 1.0%, most preferably about 0.7% relative to the weight of the grafted olefinic copolymer. A suitable copolymer is available commercially from Exxon under the trade name Exxelor VA-1803.

The composition of the invention contains pigments and/or dyes—hereinafter pigments—the use of which is well known in the polycarbonate art. The pigments suitable in the present context are readily available in commerce.

The composition of the invention may be prepared conventionally, using procedures well known in the art of thermoplastic molding compositions. Further, additives, reinforcements, fillers, stabilizers flame retarding and mold release agents, which are known for their efficacies in the context of polycarbonate based molding compositions are suitable for use in the composition of the invention.

The invention is illustrated below. In the exemplified pigmented compositions below, the graft polymer was ABS resin which contained 75% butadiene and 25% of styrene-acrylonitrile, the polycarbonate resin was a homopolycarbonate having a melt flow rate (MFR) per ASTM D 1238, of about 19.8 gram/10 minutes, and the olefinic graft copolymer was Exxelor VA 1803.

EXAMPLES

Compositions within the scope of the invention were prepared and their properties determined as summarized below. These properties were set in comparison to other relevant compositions. The reported impact strength is ⅛" notched Izod; the indicated samples were subjected to aging for 4 days at 120° C. The tensile elongation values were determined on samples which were similarly aged.

TABLE 1

| Composition | 1 | 2 | 3 |
|---|---|---|---|
| Polycarbonate (Wt. %) | 100.0 | 95.0 | 95.0 |
| ABS (Wt. %) | — | 5.0 | 2.5 |
| Olefinic copolymer | — | — | 2.5 |
| MFR | 19.8 | 16.6 | 20.5 |
| Impact Strength @ 23° C. ft.-lbs./inch | <2.5 | 8.4 | 10.1 |
| Impact Strength @ −30° C. ft.-lbs./inch | <2.0 | 5.5 | 4.1 |

TABLE 2

| Composition | 4 | 5 | 6 | 7 |
|---|---|---|---|---|
| Polycarbonate (Wt. %) | 100.0 | 95.5 | 95.5 | 95.5 |
| ABS (Wt. %) | — | 4.5 | 2.25 | 4.5* |
| Olefinic copolymer | — | — | 2.25 | — |
| MFR | 19.8 | 15.5 | 16.8 | 16.1 |
| Tensile Elongation, % | <10 | 18.4 | 30.5 | — |
| Impact Strength ft.-lbs./inch (aged) | <2.5 | 9.3 | 10.0 | 6.2 |

*the impact modifier used in composition 7 (control) was a grafted butadiene rubber, Paraloid 3607 from Rohm and Haas.

Of the compositions demonstrated above, only the compositions in accordance with the invention, compositions 3 and 6, combine good mechanical properties and good cosmetics.

Although the invention has been described in detail in the foregoing for the purpose of illustration, it is to be understood that such detail is solely for the purpose and that variations can be made therein by those skilled in the art without departing from the spirit and scope of the invention except as it may be limited by the claims.

What is claimed is:

1. A pigmented thermoplastic molding composition comprising
   (i) about 94 to 98 percent of an aromatic polycarbonate,
   (ii) about 2 to 6 percent of ABS resin having
      a) a butadiene-based backbone characterized in having a butadiene content of about 35 and 85 percent relative to the weight of said ABS and wherein backbone has a particle size of about 0.05 to 5 microns and
      b) a grafted phase polymerized in the presence of said backbone, said phase containing a first group of monomers which comprise monovinyl aromatic hydrocarbon and a second group of monomers comprising acrylonitrile and/or acrylic acid esters, and
   (iii) about 2 to 6 percent of a grafted olefinic copolymer, wherein said grafted olefinic copolymer is a graft polymer of one or more unsaturated dicarboxylic acid or the anhydride of said acid on an olefinic copolymer backbone having a weight average molecular weight of about 25,000 to 500,000, and a glass transition temperature below −30° C., and
   (iv) at least one member selected from the group consisting of pigments and dyes.

2. The composition of claim 1 weight is about 30,000 to 100,000.

3. The composition of claim 2 wherein said glass transition temperature is below −50° C.

4. The composition of claim 1 wherein said acid is selected from the group consisting of maleic, citraconic, aconitic, itaconic, citric and fumaric acids.

5. The composition of claim 1 wherein said copolymer is substantially amorphous.

6. The composition of claim 1 wherein said copolymer backbone consists of an ethylene-propylene copolymer.

7. The composition of claim 6 wherein said graft in (iii) consists of maleic acid anhydride.

8. The composition of claim 6 wherein said ethylene and propylene are each present in the range of 1 to 99 percent by weight, relative to the weight of the backbone.

9. The composition of claim 1 wherein said graft in (iii) is present in an amount of about 0.1 to 10% relative to the weight of the grafted olefinic copolymer.

10. The composition of claim 9 wherein said amount is 0.5 to 1.0%.

* * * * *